United States Patent [19]

Kinghorn et al.

[11] Patent Number: 5,184,220
[45] Date of Patent: Feb. 2, 1993

[54] TELETEXT DECODER APPARATUS INCLUDING FEATURE OF INHIBITING GENERATION OF AN END-OF-PAGE SIGNAL

[75] Inventors: John R. Kinghorn, Brockenhurst; Jeremy R. Stevens, Lymington, both of United Kingdom

[73] Assignee: U.S. Philips Corp., New York, N.Y.

[21] Appl. No.: 647,620

[22] Filed: Jan. 28, 1991

[30] Foreign Application Priority Data

Jan. 31, 1990 [GB] United Kingdom ............... 9002118

[51] Int. Cl.⁵ .................. H04N 7/087; H04N 7/04; H04N 7/08
[52] U.S. Cl. ................................. 358/147; 358/146
[58] Field of Search ............... 358/147, 146, 142, 86

[56] References Cited

U.S. PATENT DOCUMENTS 4,701,794 10/1987 Fröling et al. .................. 358/147
4,991,018 2/1991 Davies ............................ 358/147

FOREIGN PATENT DOCUMENTS 3622308 1/1988 Fed. Rep. of Germany .
60-196084 10/1985 Japan ............................. 358/147
2240697 8/1991 United Kingdom .

OTHER PUBLICATIONS

"Specification of Standards for Broadcast Teletext Signals", Teletext Specification, IBA Technical Reviews, pp. 76-89, Sep. 1976.
"Computer Controlled Teletext User's Manual", Mullard Application Laboratory, 1983 Nov. 01.

Primary Examiner—James J. Groody
Assistant Examiner—Safet Metjahic
Attorney, Agent, or Firm—David Schreiber

[57] ABSTRACT

A "correct page header received" (CPHR) flip-flop (3) is set by the page header of a required teletext page and reset by the next following page header, a "page end" flip-flop (15) generates a page end output (17) in response to the receipt of the next following page header, a "row received" flip-flop (11) detects at least one row of the required teletext page, a gate (14) inhibits the generation of an end of page output (21) for a predetermined period, typically corresponding to three field intervals, and an AND gate (18) further inhibits the generation of an end of page output (21) if there has been a subsequent detection of a further page header of the required teletext page within the predetermined period.

14 Claims, 3 Drawing Sheets

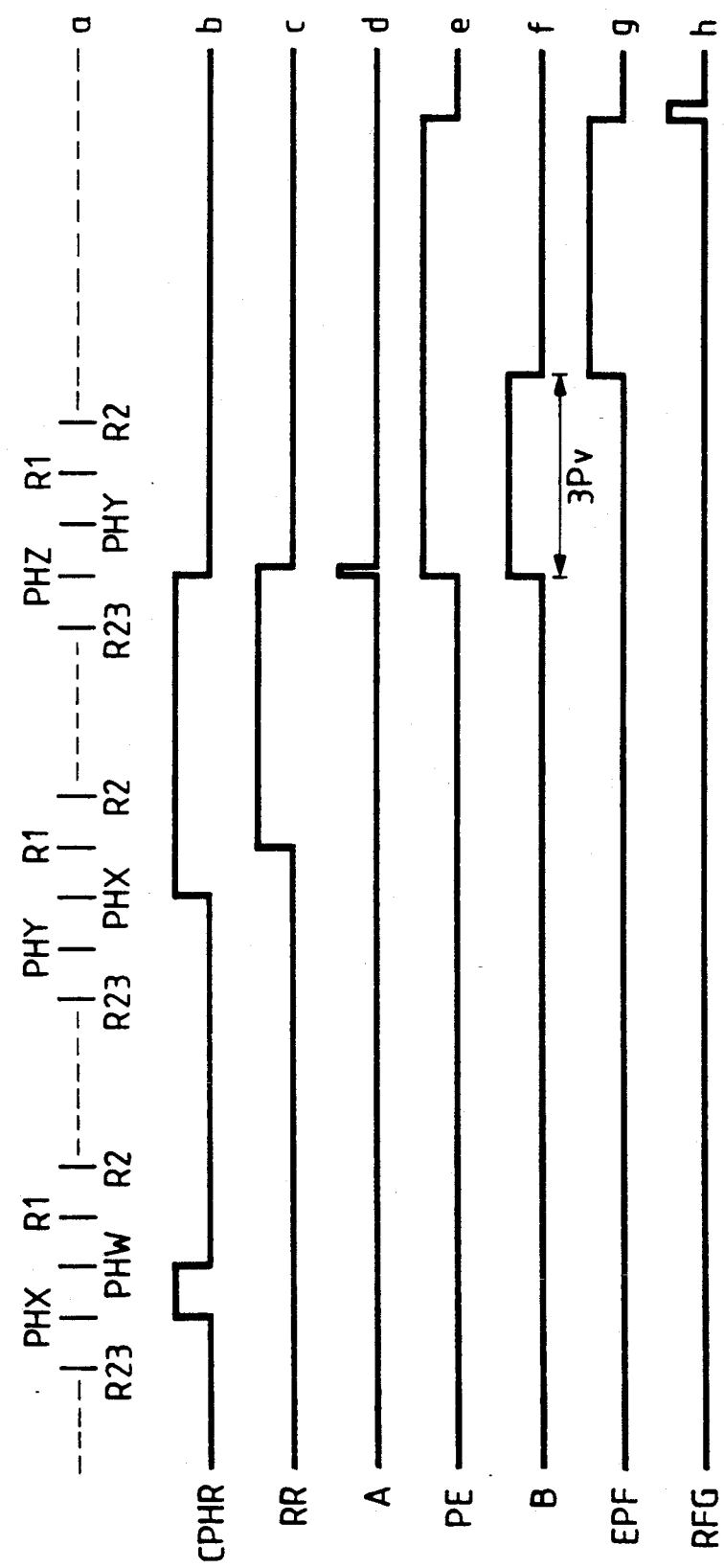

TELETEXT DECODER APPARATUS INCLUDING FEATURE OF INHIBITING GENERATION OF AN END-OF-PAGE SIGNAL

FIELD OF THE INVENTION

This invention relates to a teletext decoder comprising means for detecting the page header of a required teletext page, means for detecting the next following page header, and means responsive to the detection of said next following page header for generating an end of page signal, and to a method of operating such a teletext decoder.

BACKGROUND OF THE INVENTION

Decoders of this type can conform to the "World System Teletext and Data Broadcasting System—Technical Specification", December 1987, published by the U.K. Department of Trade and Industry.

It is frequently necessary to determine when the transmission of a teletext page has been completed. For example, it may be desired to reallocate an acquisition circuit to a different page memory, or to commence processing of, so-called, extension packets. If these actions are commenced before a page has been completed an incorrect display may result. Conversely, if these actions are delayed by a significant amount a poorer performance will result; e.g. a delay in capturing a group of pages or a delay in generating the correct display.

Unfortunately there is nothing in the World System Teletext Technical Specification which guarantees the completion of the page. With the normal transmission sequence, a page commences with a page header, followed by the rows for the page. It might be though that detection of the following page header would be sufficient to indicate the completion of the page. However there are circumstances when this method cannot be relied upon.

For example, a problem can arise with the transmission of subtitles. Teletext subtitles for the deaf or in other languages are closely related to the accompanying picture signal and timing is quite critical if they are to appear and disappear in an appropriate way. It is therefore common practice for the transmission network to give a high priority for subtitles, in such a way that they can interrupt the transmission of a normal full teletext page. Thus, a page header for a normal teletext page may be transmitted followed by the rows of that particular teletext page. Before the normal teletext page has been completed, it may be decided to transmit a teletext subtitle and this is done by transmitting a subtitle page header followed by one or more teletext rows. The normal teletext page is then resumed by transmitting the page header for that page again followed by the remaining rows of that page. In this case the page header of the normal teletext page is followed by the subtitle page header, and this will be detected as an "end of page" signal which is produced before the normal teletext page has been completed.

A problem can also arise with the use of, so-called, "advanced headers". This is a transmission sequence used by some broadcasters to improve transmission efficiency. In the World System Teletext Technical Specification it is specified that the first transmission of a page header must be separated from the rows of the page by at least one field period in order to provide a page clearing interval which enables a previously acquired teletext page to be cleared from memory. If this does not occur naturally in the transmission sequence the conventional approach is to repeat the same page header or fill with other information until the next field interval. However this can waste a significant proportion of the transmission capacity if a large number of lines in the vertical blanking interval are being used. A way of minimizing this wastage is to use the "advanced header" technique whereby at the start of each page the current page header is preceded by the header for the next page in sequence. When the current page is completed, the page header for the next page is transmitted, and this can be followed immediately with the rows corresponding to that page, without the need to wait the one field period normally required for page clearing, since the "advanced header" has already given the warning necessary to fulfil the required page clearing requirements. Again, however, a simple "end of page" signal derived using the arrival of the next page header would result in an incorrect "end of page" signal being generated.

In order to overcome these problems and to take account of the "worst case" situation it has been found necessary to introduce a software delay, typically in the order of 0.5 seconds in order to determine whether an "end of page" signal is a true signal or not.

SUMMARY OF THE INVENTION

It is an object of the present invention to provide a teletext decoder having an improved "end of page" detection arrangement which overcomes the aforesaid problems.

According to one aspect of the present invention there is provided a teletext decoder comprising means for detecting the page header of a required teletext page, means for detecting the next following page header, and means responsive to the detection of the next following page header for generating an end of page signal, characterised by means for detecting at least one row of the required teletext page, and means for inhibiting the generation of the end of page signal if at least one row of the required teletext page has not been detected, or if there has been a subsequent detection of a further page header of the required teletext page within a predetermined period.

By arranging that the end of page signal is inhibited for a predetermined period, typically corresponding to three field blanking intervals, and is further inhibited if there has been a subsequent receipt of a further page header of the required teletext page the problem arising with the transmission of subtitles is overcome, and by requiring that at least one row of the required teletext page be detected, the problem regarding "advanced headers" is avoided.

In one arrangement for carrying out the invention according to the one aspect there may be provided a teletext decoder characterised by a first bistable device which is set in one of its states in response to the receipt of the page header of the required teletext page and in its other state in response to the receipt of the next following page header, a second bistable device which is set in one of its states in response to the receipt of the at least one row of the required teletext page and is subsequently set in its other state, first gating means responsive to the receipt of the next following page header and the output of the second bistable device for generating a signal indicative of a possible page ending, delay means having a delay corresponding to the predetermined period to which the output of the first gating means is applied, and second gating means operable on the output of the delay means and in response to the output of the first bistable device and the output of the first gating means for generating the end of page signal.

Conveniently, a third bistable device may be provided which is set in one of its states but the output from the first gating means and is subsequently set in its other state; the second gating means may take the form of an AND gate to which an inverted output of the first gating means, an inverted output of the delay means and the output of the third bistable means are applied; further delay means may be provided responsive to the receipt of the next following page header for setting the second bistable means in its other state; the third gating means may be provided which is responsive to the output of the second gating means and to a further signal for setting the third bistable device in its other state.

Preferably, the predetermined period of the delay means corresponds to three field blanking intervals of a received teletext signal.

In accordance with a second aspect of the present invention there is provided a method of operating a teletext decoder comprising the steps of detecting the page header of a required teletext page, detecting the next following page header, and generating an end of page signal in response to the detection of the next following page header, characterised by the steps of detecting at least one row of the required teletext page, and inhibiting the generation of the end of page signal if at least one row of the required teletext page has not been received, or if there has been a subsequent detection of a further page header of the required teletext page within a predetermined period.

IN THE DRAWING

An exemplary embodiment of the invention will now be described reference being made to the accompanying drawings, in which:

FIG. 4 depicts various waveforms existing in the arrangement of FIG. 1 when teletext "advanced headers" are being received.

BRIEF DESCRIPTION OF THE PREFERRED EMBODIMENT

The embodiment of the invention to be described is a modification of a conventional teletext decoder which is designed to operate in accordance with the aforementioned World System Teletext Technical Specification and as such the overall operation of a teletext decoder will not be described. Only those parts of a teletext decoder which are necessary to explain the features and operation of the present invention will be considered.

The arrangement shown in FIG. 1 of the drawings forms part of the normal data acquisition circuit of a teletext decoder, the parts above the dashed lines being normally provided, and the parts below the dashed lines being additional in order to implement the present invention.

Figure 1:
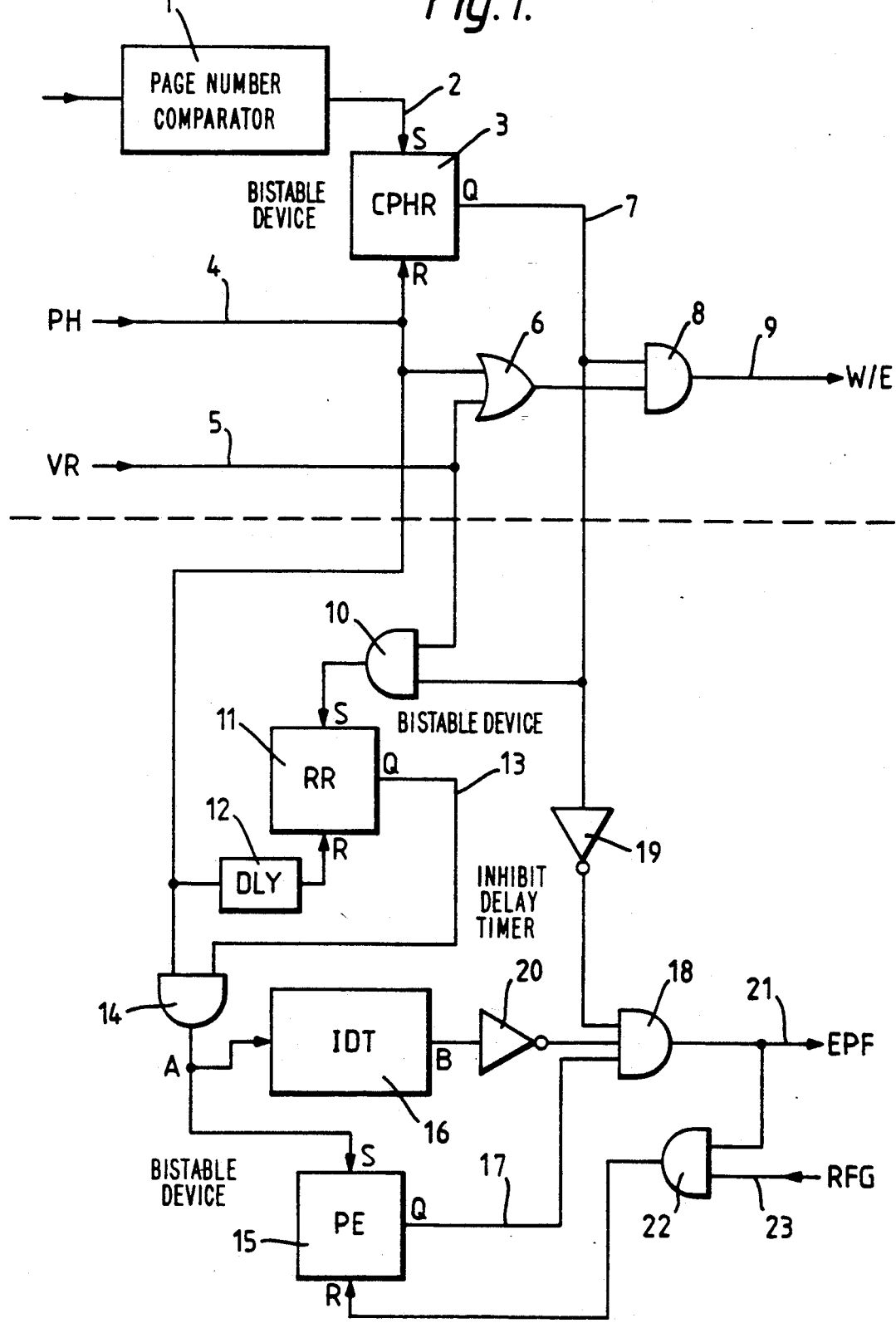
FIG. 1 is a block schematic diagram of part of a teletext decoder according to the present invention.

In FIG. 1 there is depicted a page number comparator 1 which compares the page number of each received teletext page with the page number of a required teletext page (i.e. requested by a user) and which affords an output 2 to a bistable device or flip-flop 3. The flip-flop 3, which is conveniently referred to as the CPHR (correct page header received) flip-flop is set by the output from the page number comparator 1 corresponding to the page header of a required teletext page, and is reset by the next following page header PH (of the correct magazine) afforded on input 4. A signal indicative of a "valid row" VR corresponding to the required teletext page is afforded on input 5. The signals on inputs 4 and 5 are applied to an OR gate 6, the output from which together with the output 7 from the CPHR flip-flop 3 is applied to an AND gate 8 to generate a "write enable" signal W/E—on output 9—in the usual way.

In conventional teletext decoders an end of page signal is derived from the CPHR flip-flop 3 but because this is set by the page header of a required teletext page and is reset by the next following page header, if this latter page header is not that of the teletext page which is next in number sequence, which is the case when teletext subtitles or "advanced headers" are used, then the end of page signal which is generated will not be correct and, as has been described, can result in an incorrect display or poor system performance.

In order to alleviate these problems, the data acquisition circuit is provided with the additional circuitry shown below the dashed lines in FIG. 1, the operation of which will be described with reference to the various waveforms shown in FIG. 2 of the drawings which relate to a teletext decoder operating under normal conditions.

As will be appreciated, teletext data is normally transmitted as part of a television signal, use being made of the lines which comprise the field blanking interval. Normally, each row of a teletext page will be transmitted in one of the lines of the television signal field blanking interval. Typically, eight of the lines of the field blanking interval may be used for teletext transmission purposes, so that a teletext page, which would normally consist of a page header PH and twenty-three display rows R1 to R23, would be transmitted over a number of fields of the television signal.

Figure 2:
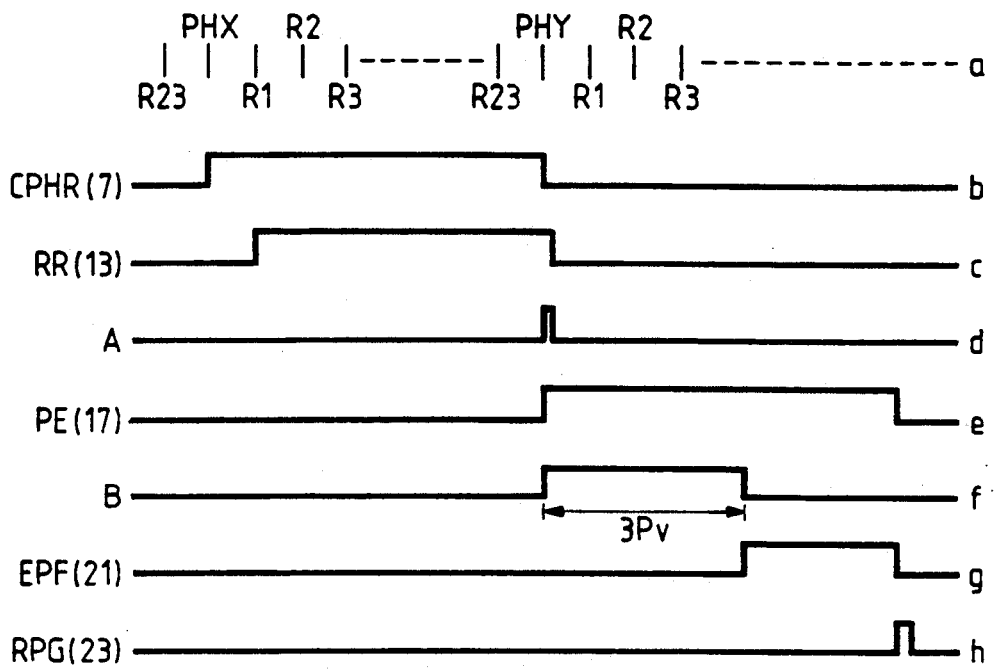
FIG. 2 depicts various waveforms existing in the arrangement of FIG. 1 under normal operating conditions.

In line (a) of FIG. 2 there is depicted diagramatically a page header PHX (of page X) which is preceded by row R23 (of the previous teletext page W) and which is followed by rows R1, R2 . . . R23 of page X. Row R23 of page X is followed by page header PHY (of page Y) which is followed by rows R1, R2 . . . of page Y. Waveform (b) of FIG. 2 depicts the output 7 of CPHR flip-flop 3 of FIG. 1 which is set on page header PHX and is reset on page header PHY.

In line FIG. 1, the output 7 from the CPHR flip-flop 3, shown by waveform (b) in FIG. 2, together with the "valid row" VR signal on input 5, corresponding to row R1 in (a) of FIG. 2, is applied to an AND gate 10, the output from which is used to set a "row received" (RR) bistable device or flip-flop 11. The "page header" signal on input 4, which corresponds to the next following page header, e.g. page header PHY in (a) of FIG. 2, is applied to a delay circuit DLY 12 the output from which is used to reset the RR flip-flop 11. The output 13 from the RR flip-flop 11 is shown by waveform (c) in FIG. 2.

The "page header" signal on input 4 is also applied to an AND gate 14 together with the output 13 from RR flip-flop 11 to generate a signal A shown by waveform (d) in FIG. 2. The output A from the AND gate 14 is used to set a "page end" PE bistable device or flip-flop 15 and also to start an inhibit delay timer 16 which typically has a delay time period corresponding to three field blanking intervals of the received teletext signal. The output 17 from the PE flip-flop 15 is shown by waveform (e) in FIG. 2 and the output B from the inhibit delay timer 16 is shown by waveform (f) in FIG. 2.

The output 17 from the page end PE flip-flop 15 is applied to an AND gate 18 together with the output 7 from CPHR flip-flop 3 inverted by an inverter 19, and the output B from the inhibit delay timer 16 inverted by an inverter 20, the output 21 from the AND gate 18 constituting an end of page flag EPF shown by waveform (g) in FIG. 2. The end of page flag output 21 is applied to an AND gate 22, together with a read flag register RFG input 23 generated elsewhere in the control circuit of the teletext decoder, the input 23 being shown by waveform (h) in FIG. 2, and the output from the AND gate 22 is used to reset the PE flip-flop 15.

A typical operation of the arrangement of FIG. 1 will be described, reference being made to the waveforms of FIG. 2.

When a required page header (PHX in line (a) of FIG. 2) is received, the CPHR flip-flop 3 is set, and is reset by the next following page header (PHY in line (a) of FIG. 2), as shown by waveform (b) in FIG. 2.

The RR flip-flop 11 is set when the first row (R1 in line (a) of FIG. 2) is received. When the next following page header (PHY in line (a) of FIG. 2) is received this causes a pulse to appear on output A of AND gate 14 before being reset. The output A initiates the inhibit delay timer 16 (output B) and sets the PE flip-flop 15 (output 17). After three field periods 3Pv have elapsed, the waveforms applied to the AND gate 18 are such as to enable the end of page flag output EPF 21 [(g) in FIG. 2] until the read flag register 23 causes the PE flip-flop 15 to be reset.

Thus the arrangement has detected that the page header PHY is indicative of the end of the page initiated by the page header PHX and has enabled the end of page flag EPF output 21 accordingly.

Figure 3:
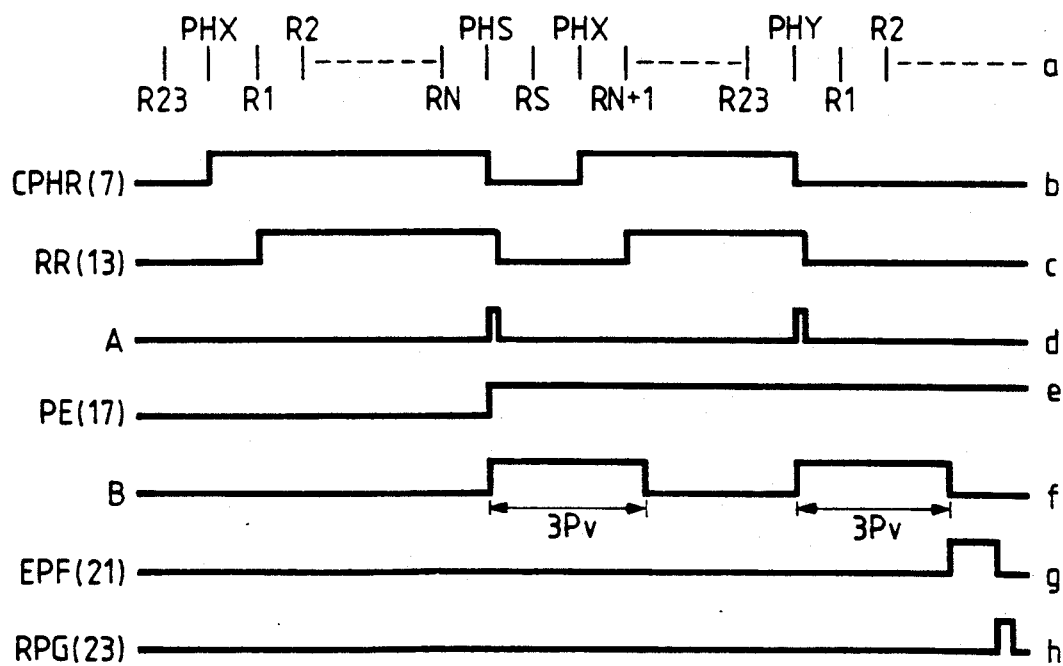
FIG. 3 depicts various waveforms existing in the arrangement of FIG. 1 when teletext subtitles are being received.

In FIG. 3, there is depicted typical waveforms appearing at various points in FIG. 1 when a required teletext page, initiated by a page header PHX is interrupted by a subtitle page header PHS and a subtitle row RS.

In line (a) of FIG. 3, page X has reached row RN when it is interrupted by the subtitle page header PHS. This is followed (after a field interval) by a subtitle row RS. Page X is resumed by the re-transmission of its page header PHX followed by the remaining rows RN+1 .. . R23.

With conventional teletext decoders, the receipt of page header PHS after required page header PHX could be used to generate, incorrectly, an end of page signal which would occur after row RN and not row R23.

The arrangement of FIG. 1 prevents this happening.

In FIGS. 1 and 3, the CPHR flip-flop 3 is set at the first receipt of page header PHX, is reset by the subtitle page header PHS, is again set by the second receipt of page header PHX and is reset by page header PHY.

The RR flip-flop 11 is set by row R1, reset by page header PHS, is again set by row RN+1, and is reset by page header PHY.

A pulse is produced on output A at page header PHS which initiates the inhibit delay timer 16 (output B) and sets the PE flip-flop 15 (output 17). After three field periods have elapsed, the AND gate 18 cannot be enabled to generate the end of page flag output 21 because the CPHR flip-flop 3 is again in its set state.

A further pulse is produced on output A at page header PHY which again initiates the inhibit delay timer 16 (output B), and after three field periods 3 Pv have elapsed the AND gate 18 is enabled to generate the end of page flag output 21, the CPHR flip-flop 3 having been reset by the page header PHY.

Thus the end of page flag EPF output 21 is generated on the receipt of the page header PHY and not the subtitle page header PHS. The example which has been considered assumes the teletext subtitle interrupts somewhere in the middle of the page X. It is possible, of course, for the interruption to come just after the page header before another row. In this case the RR flip-flop 11 would not be set on the first occasion but only after the interruption, giving just one A pulse and a similar situation to FIG. 2.

Provided the transmission of the teletext subtitle does not occupy more than three field blanking intervals this technique will give a reliable indication of end of page. Subtitles having two rows of text will take three field periods to transmit if only one line in the field blanking interval is used. This is normally the worst case situation. For correct operation, the inhibit delay timer 16 should remain active until the end of the field blanking interval three field periods after it is initiated, to allow time for the page header resuming the page transmission to be recognized.

In FIG. 4, there is depicted typical waveforms appearing at various points in FIG. 1 when use is made of "advanced headers". In this case, and as shown at line (a) in FIG. 4, the arrival of page X is anticipated by the transmission of its page header PHX before commencement of the previous page in the sequence, i.e. before the transmission of page header PHW. Similarly the arrival of page Y is anticipated by the transmission of its page header PHY before the commencement of the previous page header PHX. In the same way, the second transmission of page header PHY is preceded by page header PHZ.

Thus, as depicted by waveform (b) in FIG. 4, the CPHR flip-flop 3 is set at page header PHX; is reset at page header PHW; is set at page header PHX; and is reset by waveform page header PHZ. As shown at (c) in FIG. 4, the RR flip-flop 11 is set on the first valid row R1 following second transmission of page header PHX and is reset at page header PHZ. It is to be noted that the RR flip-flop 11 is not set following the first transmission of page header PHX because it is not followed by any rows of page X. The pulse on output A is generated at page header PHZ and initiates the delay inhibit timer 16 (output B) and sets the PE flip-flop 15 (output 17). After three field periods 3 Pv have elapsed, the AND gate 18 is enabled to generate the end of page flag output EPF 21.

One of the main applications of the present invention will be multipage decoders where the number of page memories available exceed the number of acquisition circuits. In this case it is necessary, once a memory has been filled, to re-allocate an acquisition circuit to a different memory, and this can be done using a system of pointers (a pointer is a register containing the current memory address for a given acquisition circuit). The pointers are set by software in the control microprocessor, but they may only be altered when acquisition of a page is completed. This is done by the software recognizing the end of page flag and taking the appropriate action.

The end of page flags could be recognized by the microprocessor simply polling a register. However a faster response can be given by generating an interrupt on the setting of any end of page flag, causing the microprocessor to examine the contents of the register more quickly. The software must remember which end of page flags were set, as the action of reading the register causes a reset ready for the next reception of the pages. It may be that several end of page flags were set, and the software must deal with each one in turn.

The end of page flags are also needed for page processing, for example extension packets used to give a multi-language display. The sooner the software can respond to generate the correct display the better.

The present invention relates to the transmission sequences for normal teletext pages. It does not cope with the special case of subtitle processing, especially in parallel magazine mode. In this case the subtitle is the only page in the magazine on many occasions, and its header is only transmitted at infrequent intervals. The subtitle data is simply overwritten as necessary, and there is no such thing as the end of the page. The only difference between an old and new subtitle is the data content. Switching of pointers to change acquisition circuits is not necessary with subtitles, and as fast a response as possible is desirable when processing extension packets for subtitles. End of page flags are not appropriate in this context, and the software should treat subtitles as a special case.

For all normal teletext pages, however, the present invention provides a reliable method of detecting end of page to allow the construction of teletext decoders with good performance in multipage capture and page processing.

From reading the present disclosure, other modifications will be apparent to persons skilled in the art. Such modifications may involve other features which are already known per se and which may be used instead of or in addition to features already described herein.

What is claimed is:

1. A teletext decoder comprising: means for detecting the page header of a required teletext page, means for detecting the next following page header, and means responsive to the detection of said next following page header for generating an end of page signal, means for detecting at least one row of said required teletext page, and means for inhibiting the generation of said end of page signal if 1) at least one row of said required teletext page has not been detected, or 2) there has been a subsequent detection of a further page header of said required teletext page within a predetermined period.

2. A teletext decoder as claimed in claim 1 wherein said means for detecting the next following page header includes a first bistable device which is set in one of its states in response to the receipt of the page header of said required teletext page and in its other state in response to the receipt of said next following page header, said means for inhibiting including a second bistable device which is set in one of its states in response to the receipt of said at least one row of said required teletext page and is subsequently set in its other state, first gating means responsive to the receipt of said next following page header and the output of said second bistable device for generating a signal indicative of a possible page ending, delay means having a delay corresponding to said predetermined period to which the output of said first gating means is applied, and second gating means operable on the output of said delay means and in response to the output of said first bistable device and the output of said first gating means for generating said end of page signal.

3. A teletext decoder as claimed in claim 2 wherein said means for inhibiting includes a third bistable device which is set in one of its states by the output from said first gating means and is subsequently set in its other state.

4. A teletext decoder as claimed in claim 3, wherein the second gating means comprises an AND gate to which an inverted output of said first gating means, an inverted output of said delay means and the output of said third bistable means are applied.

5. A teletext decoder as claimed in claim 2 wherein said means for inhibiting includes further delay means responsive to the receipt of said next following page header for setting said second bistable means in its said other state.

6. A teletext decoder as claimed in claim 3 including third gating means which is responsive to the output of said second gating means and to a further signal for setting said third bistable device in its said other state.

7. A teletext decoder as claimed in claim 2 wherein the predetermined period of said delay means corresponds to three field blanking intervals of a received teletext signal.

8. A teletext decoder as claimed in claim 3 wherein said means for inhibiting includes further delay means responsive to the receipt of said next following page header for setting said second bistable means in its said other state.

9. A teletext decoder as claimed in claim 4 wherein said means for inhibiting includes further delay means responsive to the receipt of said next following page header for setting said second bistable means in its said other state.

10. A teletext decoder as claimed in claim 4 including third gating means which is responsive to the output of said second gating means and to a further signal for setting said third bistable device in its said other state.

11. A teletext decoder as claimed in claim 8 including third gating means which is responsive to the output of said second gating means and to a further signal for setting said third bistable device in its said other state.

12. A teletext decoder as claimed in claim 11 including third gating means which is responsive to the output of said second gating means and to a further signal for setting said third bistable device in its said other state.

13. A teletext decoder as claimed in claim 12 wherein the predetermined period of said delay means corresponds to three field blanking intervals of a received teletext signal.

14. A method of operating a teletext decoder comprising the steps of detecting the page header of a required teletext page, detecting the next following page header, generating an end of page signal in response to the detection of said next following page header, detecting at least one row of said required teletext page, and inhibiting the generation of said end of page signal if at least one row of said required teletext page has not been detected, or if there has been a subsequent detection of a further page header of said required teletext page within a predetermined period.

* * * * *